Patented May 9, 1933

1,908,549

UNITED STATES PATENT OFFICE

OMAR H. SMITH, OF WEST ENGLEWOOD, NEW JERSEY, ASSIGNOR TO THE NAUGATUCK CHEMICAL COMPANY, OF NAUGATUCK, CONNECTICUT, A CORPORATION OF CONNECTICUT

PROCESS FOR MAKING TOUGH STYROL POLYMERS

No Drawing.     Application filed May 24, 1929.  Serial No. 365,794.

This invention relates to a process for making tough styrol polymers, and more particularly to a process for making such polymers from styrols produced by heating halogen alkyl benzols in the presence of a base.

Styrols have been produced by various processes, and various processes are known for polymerizing such styrols, some of which latter produce the tough or alpha polymer, while others produce a brittle polymer. However, up to the present time known practical applications of the latter are limited as compared with the tough polymer. In a companion application, Serial No. 361,262, filed May 7, 1929, I have disclosed a method for making a styrol by heating a halogen alkyl benzol in the presence of a base under atmospheric pressure. When the styrol thus formed has been polymerized by the methods previously used for producing a tough polymer, it has instead produced a brittle polymer. While applicant does not definitely know why styrols produced by heating a halogen alkyl benzol in the presence of a base form brittle polymers when polymerized, and he does not wish to be bound by any theory, he believes that possibly this difficulty may be caused by residual halogen.

An object of the invention is to provide a process for making a tough styrol polymer from an unpolymerized styrol which ordinarily will produce a brittle polymer. Other objects will appear from the detailed disclosure in the specification and claims.

The invention consists broadly in polymerizing a styrol to a tough polymer by heating it under a reflux condenser in the presence of a small amount of a basic material, or water, or both, using as a raw material a styrol obtained by heating a halogen alkyl benzol in the presence of a base.

In carrying out the invention, a solution of unpolymerized styrol derived from a halogen alkyl benzol, and in a concentration above approximately 45%, is heated under a reflux condenser in the presence of a small amount of a basic material, or water, or both, until the styrol has polymerized to the tough or alpha polymer. The styrol used as a raw material is produced by heating a halogen alkyl benzol in the presence of a base at atmospheric pressure, and the resulting product is fractionated to isolate higher boiling portions, which latter are then subjected to a second treatment with a base, all as set forth in detail in my copending application above mentioned, while the lower boiling fraction is subjected to the polymerizing process of the present invention.

For instance, chlor ethyl benzol may be fractionated, the portion coming over below 155° C. being returned to the process, and the residue may be heated at atmospheric pressure in the presence of pyridine and the reaction products acidified, steam distilled and the steam distillate fractionated, the portion coming over below 160° C. being polymerized as hereinafter described.

When the styrol as obtained from chlor ethyl benzol by heating in the presence of a base has been polymerized by the known methods for producing a tough polymer, a brittle polymer has invariably been obtained instead of the expected tough polymer. But I found that when the same styrol was polymerized in the presence of a small amount of organic or inorganic basic compound, or in the presence of water, or in the presence of both basic compound and water, an improved and tough polymer was obtained when the other conditions previously used for obtaining the tough polymer were present. The following examples will illustrate the results obtained when using a styrol obtained from chlor ethyl benzol, and when polymerizing with and without a basic compound or water or both.

*Example 1 (Blank)*.—A 24 gram sample of styrol solution, obtained by heating chlor ethyl benzol at atmospheric pressure in the presence of pyridine, was polymerized by heating for 72 hours under a reflux condenser at a temperature between 115–120° C., this solution having a concentration of about 45–50% styrol. No basic compound or water was used, and 10.5 grams of brittle resin were obtained.

*Example 2 (Blank)*.—A 70 gram sample of a similarly obtained solution having a concentration of 45–50% and a boiling point below 160° C. was polymerized by heating under a reflux condenser at atmospheric pressure for 136 hours at 80–100° C. The resulting resin was isolated by steam distillation and dried in an electric oven at 60° C. No basic compound or water was used, and 38 grams of brittle resin were obtained.

*Example 3.*—A 48 gram sample of a similarly obtained styrol solution of a concentration of about 60% and having a boiling point below 160° C. was polymerized by heating at atmospheric pressure under a reflux condenser for 72 hours at 115–120° C., about 9 grams of sodium hydroxide in aqueous solution having been previously added to the styrol solution. After polymerization the resin was isolated by steam distillation and dried at 60° C. 28 grams of a tough, non-brittle polymer were obtained.

*Example 4.*—A 25 gram sample of a similarly prepared styrol solution having a concentration of 45–50% and a boiling point below 160° C. was mixed with 15 grams of concentrated aqueous ammonia and then polymerized by heating at atmospheric pressure under a reflux condenser for 72 hours at 115–120° C. The resulting polymer was isolated and dried as before, and 9 grams of a tough non-brittle product were obtained.

*Example 5.*—A 29 gram sample of similarly prepared styrol solution having a concentration of 45–50% and a boiling point below 160° C. was mixed with approximately ½% pyridine and then polymerized by heating under a reflux condenser for 72 hours at 115–120° C. The resulting polymer was isolated and dried as before, and 10 grams of a tough non-brittle polymerized styrol were obtained.

*Example 6.*—A 28 gram sample of similarly prepared styrol solution having a concentration of 50% and a boiling point below 160° C. was added to approximately 60 grams water, and the mixture was heated for 72 hours at 100° C. at atmospheric pressure under a reflux condenser. The resulting polymer was isolated by steam distillation and dried in an electric oven at 70° C. 11 grams of a tough non-brittle resin were obtained.

In place of chlor ethyl benzol other halogen alkyl benzols containing a plurality of alkyl groups or higher alkyl groups may be heated with a base to produce homologous alkyl styrols, and these latter may then be polymerized to tough polymers by heating with a basic compound or water or both in a manner similar to that described for the ordinary styrol. In place of sodium hydroxide, other inorganic basic compounds such as potassium hydroxide, tripotassium phosphate, etc. may be used, and in place of the aqueous ammonia and pyridine, materials such as aniline and diethyl aniline may be used. Only a small amount of the basic compound is required and the quantity will depend upon the purity of the styrol solution and the particular compound employed. Where too much of the basic compound is used, it may cause some discoloration in the tough polymer obtained, which would be objectionable where a water-white material is desired, but where a colored styrol is to be produced, a slight excess of the compound will do no harm.

By the use of my process, an improved tough polymer is obtained, the yield is good, and it enables a tough polymer to be produced from a styrol which ordinarily would give a brittle polymer. While specific examples of the process have been given as illustrations, it is obvious that changes may be made in its details without departing from the scope of the appended claims.

Having thus described my invention, what I claim and desire to protect by Letters Patent is:

1. The process of polymerizing a styrol to produce a tough alpha polymer, which comprises heating a solution of styrol derived from a halogen alkyl benzol of a concentration above approximately 45% in the presence of a basic compound.

2. The process of polymerizing a styrol to produce a tough alpha polymer, which comprises heating styrol, derived from chlor ethyl benzol, in the presence of a small amount of an inorganic base.

3. The process of polymerizing a styrol to produce a tough alpha polymer, which comprises heating styrol, derived from chlor ethyl benzol, in a solution of 45% concentration or over in the presence of a small amount of a basic compound for approximately 72 hours at 115–120° C.

4. The process of polymerizing a styrol to produce a tough alpha polymer, which comprises heating a styrol solution, derived from chlor ethyl benzol, in a concentration of 45% or over, in the presence of a small amount of a basic compound under a reflux condenser for 72 hours at 115–120° C.

5. The process of polymerizing a styrol to produce a tough alpha polymer, which comprises heating a solution of styrol derived from halogen alkyl benzol in the presence of a small amount of a basic compound at atmospheric pressure for 72 hours at 115–120° C.

6. The process of polymerizing a styrol to produce a tough alpha polymer, which comprises heating a solution of styrol derived from a halogen alkyl benzol in the presence of a basic compound.

Signed at Passaic, county of Passaic, State of New Jersey, this 20th day of May, 1929.

OMAR H. SMITH.